Nov. 25, 1930.  P. WACHSMANN  1,783,064
DYNAMO ELECTRIC MACHINE
Filed May 14, 1928
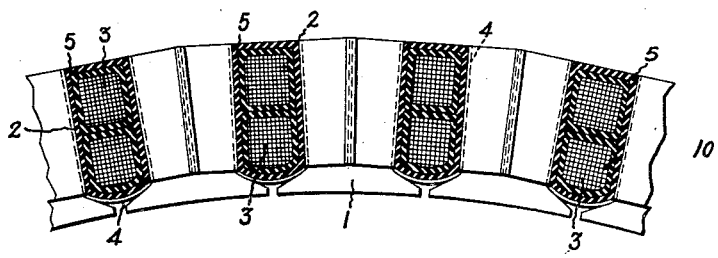
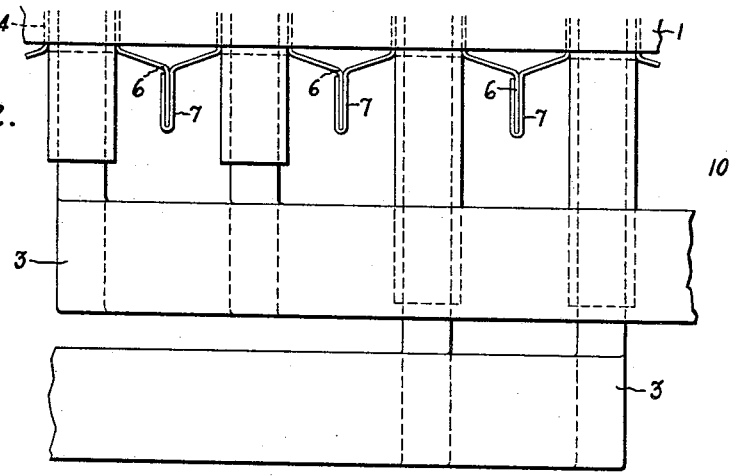
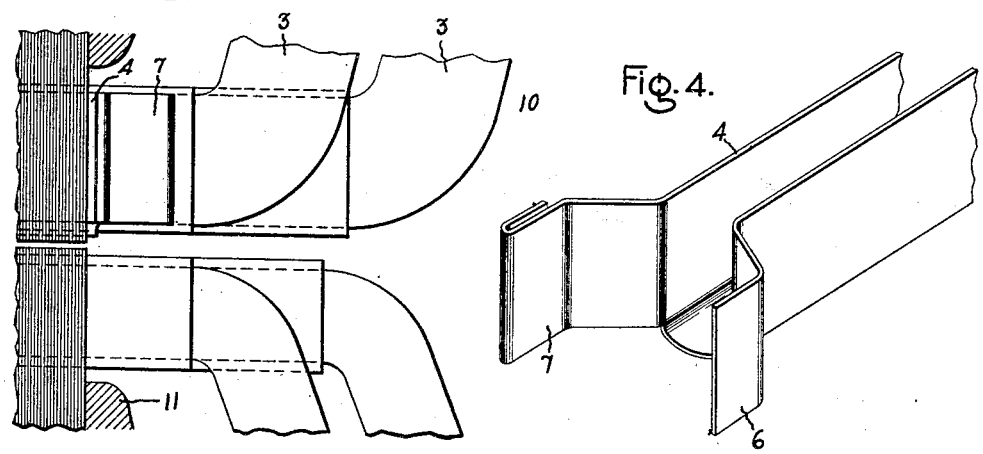
Inventor:
Paul Wachsmann,
by Charles E. Tulla
His Attorney.

Patented Nov. 25, 1930

1,783,064

UNITED STATES PATENT OFFICE

PAUL WACHSMANN, OF BERLIN-HALENSEE, GERMANY, ASSIGNOR TO GENERAL ELECTRIC COMPANY, A CORPORATION OF NEW YORK

DYNAMO-ELECTRIC MACHINE

Application filed May 14, 1928, Serial No. 277,770, and in Germany July 21, 1927.

My invention relates to dynamo electric machines and particularly to such machines as are provided with an insulated coil winding and also a squirrel cage winding.

Such arrangements of windings are used in both alternating current and direct current dynamo electric machines, the squirrel cage winding being used to dampen out rotating magnetic fields of higher harmonics in direct current machines and also in the field members of alternating current machines, and as starting windings in synchronous motors.

Heretofore in providing squirrel cage windings in machines having a distributed coil winding, various arrangements of the squirrel cage winding have been employed. Such arrangements have, however, interfered with the ventilation of the coil winding and poorly utilized the space in the magnetic structure.

My invention has for its object a novel arrangement of the squirrel cage winding in reference to the insulated coil winding, which does not interfere with the ventilation of the insulated winding and the slot space is advantageously utilized.

The various features of novelty which characterize my invention are pointed out in the claims annexed to and forming a part of this specification. For a better understanding of my invention, reference may be had to the following description taken in connection with the accompanying drawing, in which Fig. 1 is an end view, partly in section, of a portion of a stator embodying my invention; Fig. 2 is a plan view of the stator of Fig. 1; Fig. 3 is a sectional view through a portion of a dynamo electric machine, my invention being embodied in the stator thereof, and Fig. 4 is a perspective view of a conductor of my squirrel cage winding.

Referring to the drawing, the stator 10 of the dynamo electric machine illustrated may be the field member of either a direct current or alternating current machine and the rotor 11 is the armature of such machine. The stator has a magnetic member 1 provided with slots 2 therein. Insulated conductors 3 are arranged in the slots and are connected together to form a distributed field winding. Metallic tubular members 4 in the form of thin walled sleeves surround the insulation of the conductors 3. These members 4 are shown as arranged about the insulating tubes 5 of the conductors 3 and surround the same in three sides thereof, although they may completely enclose the insulating tubes 5. Beyond the laminated structure at both ends, the tubular members 4 are slitted and the ends of the two adjacent members 4 are electrically connected together. I have shown the members 4 as having slitted ends 6 and 7, the ends 7 being shown as folded about the ends 6 of the adjacent members 4, the ends 6 and 7 may then be soldered, brazed or welded together. The ends 6 and 7 of the members 4 joined together form with the end portions of these members, which extend over the insulated winding 3, two short-circuiting end rings. These tubular members thus form a squirrel cage winding.

I desire it to be understood that my invention is not limited to the particular arrangement shown and described, and aim in the appended claims to cover all modifications which do not depart from the spirit and scope of my invention.

What I claim as new and desire to secure by Letters Patent of the United States is:

1. In a dynamo electric machine, a magnetic member having slots therein, insulated conductors in said slots, said insulated conductors being connected together to form a distributed winding, and metallic tubular members in said slots surrounding said insulated conductors, the ends of said tubular members extending beyond said magnetic member and being split, one of the split ends of each of said tubular members being folded about the split end of the adjacent member to join them together so as to form a squirrel cage winding.

2. In a dynamo electric machine, a magnetic member having slots therein, insulated conductors in said slots, said insulated conductors being connected together to form a distributed winding, and metallic tubular members in said slots surrounding said insulated conductors on three sides thereof, the ends of said tubular members extending beyond said magnetic member and being split, one of the split ends of each of said tubular members being folded about the split end of the adjacent member to join them together so as to form a squirrel cage winding.

3. A bar for squirrel cage windings having a tubular body and being split at the ends thereof, each end of said bar having one straight split portion and another folded split portion for directly joining the bar to another.

4. A bar for squirrel cage windings having a channel-shaped body, the sides of said bar having integral straight and folded portions at each end thereof for joining said bar directly to another.

In witness whereof I have hereunto set my hand this 24 day of April, 1928.

PAUL WACHSMANN.